United States Patent
Jaramillo

(10) Patent No.: US 10,846,727 B2
(45) Date of Patent: *Nov. 24, 2020

(54) MOBILE COMMERCE FRAMEWORK

(71) Applicant: Hothand, Inc, Rancho Santa Margarita, CA (US)

(72) Inventor: Randy Jaramillo, Rancho Santa Margarita, CA (US)

(73) Assignee: Hothand, Inc, Rancho Santa Margarita, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,411

(22) Filed: Apr. 30, 2020

(65) Prior Publication Data

US 2020/0258111 A1    Aug. 13, 2020

Related U.S. Application Data

(63) Continuation of application No. 16/160,682, filed on Oct. 15, 2018, which is a continuation of application
(Continued)

(51) Int. Cl.
*G06Q 30/06* (2012.01)
*G06Q 30/02* (2012.01)
(Continued)

(52) U.S. Cl.
CPC ....... *G06Q 30/0222* (2013.01); *G06Q 20/322* (2013.01); *G06Q 30/0224* (2013.01);
(Continued)

(58) Field of Classification Search
CPC .............. G06Q 30/02; G06Q 30/0222; G06Q 30/0255; G06Q 30/0283; G06Q 30/0623;
(Continued)

(56) References Cited

U.S. PATENT DOCUMENTS 5,503,434 A     4/1996  Gunn
6,587,867 B1    7/2003  Miller et al.
(Continued)

FOREIGN PATENT DOCUMENTS

EP      1 376 059 A2      1/2004
WO      WO-97/20279 A1    6/1997
(Continued)

OTHER PUBLICATIONS

U.S. Appl. No. 60/349,100 ( U.S. Appl. No. 13/037,337 [ US 20120058775 A1] claims priority to thi Provisional Application; filed Jan. 16, 2002.*
(Continued)

*Primary Examiner* — Yogesh C Garg
(74) *Attorney, Agent, or Firm* — Law Office of Scott C Harris, Inc

(57) ABSTRACT

A subscription-based system for providing commerce information for one or more mobile devices for one or more merchants. Some techniques employed feature a subscription-based method for presenting commercial resources to a mobile device. The method involves receiving mobile device user information relating to a geographic location to locate one or more merchants within a subscription-based shopping network, and receiving mobile device user information relating to a merchant type within the subscription-based shopping network. The method also involves receiving, from a database over a communication network, information for one or more merchants associated with the mobile device user information for the geographic location and the merchant type, and presenting the associated merchant information on the mobile device. The associated merchant information can include a merchant name and address, a merchant telephone number, a merchant adver-
(Continued)

tisement, a merchant coupon, or a merchant product or service offering to subscribers of the shopping network.

20 Claims, 7 Drawing Sheets

Related U.S. Application Data

No. 14/451,202, filed on Aug. 4, 2014, now Pat. No. 10,102,556, which is a continuation of application No. 14/044,662, filed on Oct. 2, 2013, now Pat. No. 8,799,102, which is a continuation of application No. 12/693,956, filed on Jan. 26, 2010, now Pat. No. 8,554,632, which is a continuation of application No. 11/139,288, filed on May 26, 2005, now Pat. No. 7,693,752.

(60) Provisional application No. 60/574,988, filed on May 26, 2004.

(51) Int. Cl.
G06Q 40/02 (2012.01)
G06Q 20/32 (2012.01)

(52) U.S. Cl.
CPC ..... *G06Q 30/0236* (2013.01); *G06Q 30/0255* (2013.01); *G06Q 30/0261* (2013.01); *G06Q 30/0267* (2013.01); *G06Q 30/0601* (2013.01); *G06Q 30/0613* (2013.01); *G06Q 30/0623* (2013.01); *G06Q 30/0629* (2013.01); *G06Q 30/0631* (2013.01); *G06Q 30/0639* (2013.01); *G06Q 30/0641* (2013.01); *G06Q 40/025* (2013.01); *G06Q 30/0205* (2013.01)

(58) Field of Classification Search
CPC ........... G06Q 30/0267; G06Q 30/0631; G06Q 30/0607; G06Q 30/0609; G06Q 30/0236; G06Q 30/0641; G06Q 30/0261; G06Q 30/0613; G06Q 30/0639; G06Q 30/0601; G06Q 30/0322; G06Q 30/0205; G06Q 30/0224
USPC ... 705/26.1, 27.1, 26.41, 26.62, 26.81, 26.9, 705/14.23
See application file for complete search history.

(56) References Cited

U.S. PATENT DOCUMENTS

| | | | |
|---|---|---|---|
| 6,606,604 B1* | 8/2003 | Dutta | G06Q 30/02 705/26.8 |
| 6,633,852 B1 | 10/2003 | Heckerman et al. | |
| 6,842,433 B2 | 1/2005 | West et al. | |
| 6,947,976 B1 | 9/2005 | Devitt et al. | |
| 6,965,868 B1 | 11/2005 | Bednarek | |
| 7,071,842 B1 | 7/2006 | Brady, Jr. | |
| 7,072,975 B2 | 7/2006 | Kato | |
| 7,239,871 B2 | 7/2007 | Shamp et al. | |
| 7,343,317 B2 | 3/2008 | Jokinen et al. | |
| 7,403,785 B2 | 7/2008 | Daniels et al. | |
| 7,403,908 B1 | 7/2008 | Jaramillo | |
| 7,505,966 B2 | 3/2009 | Kato | |
| 7,680,802 B2 | 3/2010 | Kato | |
| 7,693,752 B2 | 4/2010 | Jaramillo | |
| 7,996,268 B2* | 8/2011 | Poltorak | G06Q 20/10 705/21 |
| 8,086,530 B2 | 12/2011 | Resnick et al. | |
| 2002/0007321 A1 | 1/2002 | Burton | |
| 2002/0035474 A1 | 3/2002 | Alpdemir | |
| 2002/0046104 A1 | 4/2002 | Kaddeche et al. | |
| 2002/0049644 A1 | 4/2002 | Kargman | |
| 2002/0065669 A1* | 5/2002 | Shutt | H04L 63/0407 705/26.1 |
| 2002/0065728 A1 | 5/2002 | Ogasawara | |
| 2002/0103892 A1 | 8/2002 | Rieger | |
| 2002/0107773 A1 | 8/2002 | Abdou | |
| 2002/0128903 A1 | 9/2002 | Kernahan | |
| 2002/0160761 A1 | 10/2002 | Wolfe | |
| 2002/0184208 A1 | 12/2002 | Kato | |
| 2003/0004743 A1 | 1/2003 | Callegari | |
| 2003/0004802 A1 | 1/2003 | Callegari | |
| 2003/0065805 A1 | 4/2003 | Barnes | |
| 2003/0163389 A1 | 8/2003 | Merten et al. | |
| 2003/0181201 A1 | 9/2003 | Bomze et al. | |
| 2003/0182191 A1 | 9/2003 | Oliver et al. | |
| 2004/0023666 A1 | 2/2004 | Moon et al. | |
| 2004/0166834 A1 | 8/2004 | Omar et al. | |
| 2004/0167822 A1 | 8/2004 | Chasen et al. | |
| 2004/0203909 A1* | 10/2004 | Koster | H04W 4/021 455/456.1 |
| 2004/0205031 A1 | 10/2004 | Cranner | |
| 2005/0004830 A1 | 1/2005 | Rozell et al. | |
| 2005/0015307 A1 | 1/2005 | Simpson et al. | |
| 2005/0144024 A1 | 6/2005 | Wojton et al. | |
| 2005/0211765 A1 | 9/2005 | Brown et al. | |
| 2005/0216421 A1 | 9/2005 | Barry et al. | |
| 2006/0059044 A1 | 3/2006 | Chan et al. | |
| 2006/0230104 A1 | 10/2006 | Winter | |
| 2006/0235796 A1 | 10/2006 | Johnson et al. | |
| 2006/0236257 A1 | 10/2006 | Othmer et al. | |
| 2006/0293971 A1 | 12/2006 | Hunter et al. | |
| 2012/0058775 A1* | 3/2012 | Dupray | H04W 4/029 455/456.1 |
| 2013/0110666 A1 | 5/2013 | Aubrey | |

FOREIGN PATENT DOCUMENTS

| | | |
|---|---|---|
| WO | WO-01/39064 A1 | 5/2001 |
| WO | WO-01/97131 A2 | 12/2001 |
| WO | WO-02/03224 A2 | 1/2002 |
| WO | WO-02/05173 A2 | 1/2002 |
| WO | WO-02/25823 A2 | 3/2002 |
| WO | WO-021063853 A2 | 8/2002 |
| WO | WO-03/058540 A1 | 7/2003 |
| WO | WO-2006/074054 A1 | 7/2006 |

OTHER PUBLICATIONS

"adAlive and Vindigo Offer Handheld Users Fast and Free Access to Vindigo's Location-Based Service From Airport Billboards." *PR Newswire*, Feb. 12, 2001, Web. Apr. 13, 2011. 3 pages.
"Advertisers Capitalize on the Power of Vindigo 2.0 to Reach "On-the-Go" Consumers; Moet & Chandon, Perrier, General Motors and Avis Vindigo for Contextual Ads." *Business Wire*, Apr. 14, 2003. Web. Apr. 13, 2011. 2 pages.
"CyBARguide Project Notes." www.cc.gatech.edu, Apr. 1, 2011. 6 pages.
"Earthcomber Provides Free Location-Based Content to Palm Users." pobonline.com, Nov. 17, 2004. Web. Apr. 5, 2011. 3 pages.
"go2 and Coca-Cola Announce Strategic Alliance." *Business Wire*. Dec. 4, 2000. Web. Apr. 22, 2011. 3 pages.
"go2 Systems Provides Location-Based Services to Wireless Internet Users Over Wireless Phones." *Business Wire*. Oct. 17, 2000. Web. Apr. 22, 2011. 3 pages.
"go2 Systems Secures $27 Million in Funding." *Business Wire*. Oct. 17, 2000, Web. Apr. 22, 2011. 3 pages.
"InfoMove: technology overview" *Wayback Machine*.Feb. 15, 2001. Web. 2 pages. http://www.infomove.com/Solutions/TechnologyOverview_.asp.
"L-Commerce Poised For Big Splash." *GPS World*. Jul. 2000. Web. Apr. 7, 2011. 3 pages.
"Launch Of Shop Local Delivers Local Sales And Deals Online." *ShopLocal Press Releases*. CrossMedia Services, Inc. Aug. 18, 2004, Web. Apr. 7, 2011. 2 pages.
"Location-based mobile marketing—more than advertising on mobile phones." Nyheder General interest press release, siemens.com, Mar. 12, 2002. Web. Apr. 22, 2011. 1 page.

(56) References Cited

OTHER PUBLICATIONS

"Major wireless manufacturers unite to advance development of global location-based services and applications." nokia.com. Sep. 26, 2000. Web. Oct. 24, 2000. 4 pages.
"Mobic News." Aug. 2000 Web. 11 pages.
"MS proves the argument again." *ars technica: news archive.* Arsstechnica the pc enthusiast's resource. Sep. 14, 2000. Web. Mar. 22, 2011. 18 pages. <http://arstechnica.com/archive/2000/0900.html>.
"ShoppingList.com Partners With ValuPage to Offer Grocery Coupons to Online Visitors." *PR Newswire,* Sep. 21, 1999. Web. Apr. 13, 2011. 2 pages.
"Supermarkets Online Announces Coupon Alliance With Val-Pak." *PR Newswire,* Apr. 7, 2000. Web. Apr. 13, 2011. 2 pages.
"Vindigo Debuts Free Personal Navigator Service for Palm Mobile Devices; Puts New York in Your Pocket." *Business Wire,* Mar. 27, 2000. Apr. 13, 2011. 4 pages.
"Vindigo Debuts Free Service For Palm Mobile Devices." *Telephone IP News,* May 1, 2000, Web. Apr. 13, 2000. 4 pages.
"Vindigo Ignites Mobile Advertising With Exclusive "Vindigo Instant Offers" for Palm Users On the Go." 2 pages. mobic.com.
"Vindigo No Longer Free." *I Palm Info Center,* PalmInfocenter.com Mar. 18, 2002 Web. 7 pages.
"Vindigo." *Wayback machine.* Jan. 18, 2001. Web. 2 pages.
"Vouchers: 12snap deal for mobile barcode coupon launch, Brand Republic Connecting advertising, marketing, media & PR." brandrepublic.com. Apr. 30, 2011 Web. Apr. 5, 2011. 11 pages.
"Webraska Media Release: TMN, Portugal Telecom's Mobile Subsidiary, Selects Webraska's SmartZone Geospatial Platform to Power Location-Based Services." Webraska.com.Sep. 24, 2003. Web. Apr. 7, 2011. 2 pages.
"Webraska Press Release: Webraska powers 'Orange find nearest' 2 way SMS location based service." Webraska.com. May 24, 2004. Web.Apr. 7, 2011. 2 pages.
"Webraska, AirFlash merger creates global LBS firm" m-travel.com, Sep. 24, 2001. Web. Apr. 7, 2011. 3 pages.
Abowd, George D., et al. "Context-Awareness in Wearable and Ubiquitous Computing." *Proceedings of the First International Symposium on Wearable Computers* (ISWC '97), Oct. 13-14, 1997. 3 pages.
Abowd, George D., et al. "Cyberguide: A mobile context-aware tour guide." *Wireless Networks* 3 (1997), pp. 421-433, College of Computing Georgia Institute of Technology, Atlanta, GA 30332 0280.
Buckley, Russell. "Location Based Marketing—Theory and Practice. A White Paper." Jun. 28, 2005. 59 pages.
Caceres, Ramon, et al. "Mobile Computing Technology at Vindigo." *IEEE Wireless Communications,* Feb. 2002. 5 pages.
Carros, Don. "Global Networking Strategies.", Meta Delta, File 799, MetaGroup. Aug. 30, 2000. 2 pages.
Chervokas, Jason et al. "AOL's Digital City Buys Publisher of Total New York." *Technology Cybertimes,* The New York Times on The Web, Feb. 3, 1997, Web. Apr. 7, 2011. 5 pages.
Cheverst, K., et al. "Experiences of Developing and Deploying a Context-Aware Tourist Guide: The GUIDE Project." *Distributed Multimedia Research Group Lancaster University,* Lancaster, LA14YR, U.K. 2000. 12 pages.
Cleary, Sharon. "Location-Based Information Services Will Offer Boost to Mobile Commerce." WSJ.com. Sep. 6, 2000. Web. Oct. 24, 2000. 3 pages.
Day, Julia. "ZagMe closes due to insufficient funds." *MediaGuardian,* Oct. 23, 2001. Web. Apr. 22, 2011. 1 page.
Kennedy, C.J. "SignalSoft Knows Where It's At." *Unstrung: tied to nothing but the future,* Oct. 20, 2000. Web. Oct. 24, 2000. 3 pages.
Kwan, Joshua L. "New wireless technology tracks location." SiliconValley.com. Mercury News, Oct. 15, 2000. Web. Oct. 24, 2000. 3 pages.
Long, et al. "Rapid Prototyping of Mobile Context-Aware Applications: The Cyberguide Case Study." *To appear in the Proceedings of the 2nd ACM International Conference on Mobile Computing and Networking,* 1996. College of Computing Georgia Institute of Technology. 1996. 11 pages.
Luna, Lynette, "Living with Boxes." *Connected Planet Online,* Nov. 1, 2002. Web. 3 pages.
McAuliffe, Jon. "Invention Disclosure Form.", Vindigo Inc., Apr. 5, 2000, 10 pages.
McCabe, Eric. "Location-Based Services Offer a Global Opportunity for New Revenue—Wireless." *Telecommunications Online,* Oct. 1999. Web. Oct. 24, 2000. 5 pages. <http://www.telecoms-mag.com/issues/199910/tcs/location.html>.
Medianka, Emil. "Research Brief: Location-Based Services: The Impact of Accuracy." Gartner Group, Inc., Sep. 18, 2000, 6 pages.
Olsen, Stefanie. "Google goes local." *CNET News*.Mar. 17, 2004. Web. Apr. 6, 2011. 4 pages.
Patrizio, Andy. "Live from DEMOmobile 2000!" Wired.com. Sep. 8, 2000. Web. Mar. 22, 2011. http://www.wired.com/science/discoveries/news/2000/09/38602 1 page.
Peters, Kurt. "Crossmedia Services, Inc. and AOL's Digital City Team up to Deliver Local Retail Sales & Promotion Offers to Consumers." internetretailer.com, Aug. 28, 2001. Web. Apr. 7, 2011. 2 pages.
Rios, Sergio. "Location Based Services: Interfacing to a Mobile Positioning Center." wirelessdevnet.com. Wireless Developer Network, Oct. 24, 2000 Web. 4 pages. <http://www.wirelessdevnet.corn/articles/sep2000/lbsinterfacing.html>.
Sullivan, Danny. "Local Search Part 3: Google Gets Local With AdWords." searchenginewatch.com. Oct. 28, 2003. Web. Apr. 6, 2011. 4 pages. <http://searchenginewatch.com/3099591>.
Sullivan, Danny. "Local Search Part 5: Citysearch Brings Local To Searchers & Merchants." searchenginewatch.com.Nov. 20, 2003. Web. Apr. 6, 2011. 5 pages. <http://searchenginewatch.com/3111681>.
Suillivan, Danny. "Local Search Part 1: New Developments: In Local Search & Moves By Overture." searchenginewatch.com.Oct. 14, 2003. Web. Apr. 6, 2011. 3 pages. <http://searchenginewatch.com/309134>.
U.S. Appl. No. 10/102,534 [NeuTrack]. Dec. 27, 2005. 170 pages.
U.S. Appl. No. 10/102,604(1) [NeuTrack]. Oct. 20, 2006. 121 pages.
U.S. Appl. No. 10/102,605 [NeuTrack]. Oct. 20, 2005. 118 pages.
U.S. Appl. No. 60/277,200 [NeuTrack]. Mar. 21, 2001. 45 pages.
USDC Case No. 11-CV-0481 BEN Defendant's prelim invalidity contention Appendix A—Vindigo claim chart. Anticipation/Obviousness Claim Chart for U.S. Pat. No. 7,693,752 Based on Vindigo. Sep. 30, 2011. 20 pages.
USDC Case No. 11-CV-0481 BEN Defendant's prelim invalidity contention Appendix B—Anticipation/Obviousness Claim Chart for U.S. Pat. No. 7,693,752 Based on Acuity Mobile. Sep. 30, 2011. 8 pages.
USDC Case No. 11-CV-0481 BEN Defendant's prelim invalidity contention Appendix C—Anticipation/Obviousness Claim Chart for U.S. Pat. No. 7,693,752 Based on Wilson. Sep. 30, 2011. 9 pages.
USDC Case No. 11-CV-0481 BEN Defendant's prelim invalidity contention Appendix D—Anticipation/Obviousness Claim Chart for U.S. Pat. No. 7,693,752 Based on Catalina Marketing's Systems. Sep. 30, 2011. 11 pages.
USDC Case No. 11-CV-0481 BEN Defendant's prelim invalidity contention Appendix E—Anticipation/Obviousness Claim Chart for U.S. Pat. No. 7,693,752 Based on Go2 System. Sep. 30, 2011. 8 pages.
USDC Case No. 11-CV-0481 BEN Defendant's prelim invalidity contention Appendix F—Obviousness Claim Chart for U.S. Pat. No. 7,693,752 Based on Wounder GMBH's System. Sep. 30, 2011. 7 pages.
USDC Case No. 11-CV-0481 BEN Defendant's Preliminary Invalidity Contentions—Local Patent Rules 3.3 and 3.4 Disclosures [Pleading]. Sep. 30, 2011. 17 pages.
USDC Case No. 11-CV-0481 BEN—Claim Construction Order. Feb. 6, 2013. 16 pages.
USDC Case No. 11-CV-0481 BEN—Claims Chart. Sep. 30, 2011. 17 pages.

(56) References Cited

OTHER PUBLICATIONS

USDC Case No. 11-CV-0481 BEN—Joint Claims Construction Worksheet. Sep. 30, 2011. 16 pages.
Wieland, Ken. "Where are the location-based services?" Telecom. Online. Sep. 2000. Web. Oct. 24, 2000. 7 pages. < http://www.telecoms-mag.corn/issues/200009/tci/where_are_the.html>.
Williams, Kathryn. "Coupons: Clip-Free." Newsweek, Inc. 2005, [online] 1 page. http://www.msnbc.msn.com/id/7433773/site/newsweek/prin t/1/displaymode/1098/ [retrieved] Apr. 19, 2005.

\* cited by examiner

MOBILE COMMERCE FRAMEWORK

CROSS REFERENCE TO RELATED APPLICATIONS

This application is a continuation application of U.S. patent application Ser. No. 14/044,662, filed on Oct. 2, 2013, titled "Mobile Commerce Framework," which in turn is a continuation of U.S. patent application Ser. No. 12/693,956, now U.S. Pat. No. 8,554,632, filed on Jan. 26, 2010, titled "Mobile Commerce Framework," which in turn is a continuation of U.S. patent application Ser. No. 11/139,288, now U.S. Pat. No. 7,693,752, filed on May 26, 2005, titled "Mobile Commerce Framework," which claims the benefit of priority from U.S. Provisional Application No. 60/574,988, titled "Hot-Merchant Network (mobile-commerce or m-merchant network)", filed May 26, 2004 by Randolph A. Jaramillo, the disclosures of which are hereby incorporated by reference, each in its entirety. This application is related to U.S. patent application Ser. No. 10/094,379, titled "Devices, Systems, and Methods for Solving Challenges in Telecom Sales and Marketing," filed Mar. 8, 2002 by Randolph A. Jaramillo, which is hereby incorporated by reference in its entirety.

TECHNICAL FIELD

The present disclosure relates to mobile media content, in particular subscription-based content for mobile devices and applications.

BACKGROUND

The growth of the use of cell phones and mobile devices has led to greater communication among individuals and companies. In addition to being used as communication devices for voice and text data, mobile devices can be also be used as scheduling devices by synchronizing the mobile device with computers to upload data for addresses and appointments. Mobile devices can also be used as entertainment devices by having capabilities to play computer games, play music, and video clips. As the third generation (3G) and fourth generation (4G) mobile telecommunication systems are developed and deployed, users can increase their ability to communicate, entertain, and schedule by using mobile devices with increased processing speeds, longer battery life, and/or processing and transmitting higher data rates.

SUMMARY

The present disclosure describes methods, systems, and techniques for subscription-based services using mobile devices.

In one general aspect the disclosure relates to a system for providing commercial resources for subscribers using a mobile device. The system includes a communication network for communicating with the mobile device, an application program executable on the mobile device and configured for locating one or more of the commercial resources. The system also includes an identification card associated with the subscriber and the corresponding mobile device. The identification card provides verification that the subscriber has subscription rights to access the commercial resources. The commercial resources include information relating to goods and services provided by merchants within a shopping network communicating with the communication network.

Advantageous implementations can include one or more of the following features. The mobile device can be configured to interact with a database of merchant information over the communication network. The database can be configured to store information associated with the subscribers and with merchants within the shopping network. The application program can be configured to receive subscriber preferences for merchants based on any of an area code, a city name, a township name, or a zip code. The system may also have a mapping tool to find resources in the database for the subscriber preferences. The application program may be configured to present information relating to the commercial resources. The commercial resources can include a merchant name, a merchant address, a merchant advertisement, a merchant telephone number, a merchant coupon, a merchant product offering, or a merchant service offering.

The communication network may include a satellite channel, a telephony channel, an optical channel, a wireless channel, a cable channel, or the Internet. Subscriber data can be associated with the identification card, and the subscriber data may be maintained by a member service intermediary. The member service intermediary can provide the commercial resources and the application program to the mobile device over the communication network. The member service intermediary may coordinate receiving commercial resources from merchants and providing the commercial resources to the mobile device over the communication network.

In another general aspect, techniques feature a subscription-based method for presenting merchant information to a mobile device. The method include receiving mobile device user information relating to a geographic location to locate one or more merchants within a subscription-based shopping network, and receiving mobile device user information relating to a merchant type within the subscription-based shopping network. The method involves receiving, from a database over a communication network, information for one or more merchants associated with the mobile device user information for the geographic location and the merchant type, and presenting the associated merchant information on the mobile device.

Advantageous implementations can include one or more of the following features. The device user information relating to a geographic location can include any of an area code, a ZIP code, a city name, or a township name. Each merchant within the subscription-based shopping network may be associated with at least one merchant type in the database, in which the merchant type may be classified by at least a product or service provided by the merchant. The merchant type may include, for example, a food merchant type, an entertainment merchant type, a health and beauty merchant type, or a travel type.

The associated merchant information can include a merchant name, a merchant address, a merchant advertisement, a merchant coupon, a merchant product offering to subscribers of the shopping network, or a merchant service offering to subscribers of the shopping network. The method may involve sending the mobile device user information for the geographic location and the merchant type to the database over the communication network. The method may also involve linking membership card identification to the subscription-based shopping network.

In another general aspect, the disclosure relates to a computer program product for executing real-estate transactions on a mobile device. The computer program product includes a real estate qualification tool to qualify a real estate transaction, a loan initiation tool to initiate a loan, real estate data to store in the mobile device, and one or more templates and forms for the loan initiation tool and the real estate qualification tool. The one or more templates and forms include pre-populated data. The loan initiation tool and the real estate qualification tool are operable to use real estate data transmitted over a communication network in near-real time (i.e., substantially in real-time with a small time delay for data transmission).

Advantageous implementations can include one or more of the following features. The computer program product can include a signature capturing tool to capture a signature. The signal capturing tool may be used to capture a signature and send the captured signature over the communication network. The computer program product may have a credit check tool to handle data related to checking a credit of real estate applicant(s), in which the credit check tool can be used for data transmitted over the communication network. The computer program product may include a mortgage calculator operable to perform real-estate calculations. The mortgage calculator can have functionality for calculation of monthly payments, interest and principal payments, loan fees, loan points, estimated deductions, transaction costs, amortization schedules, and percentage rates.

The computer program product may have instructions operable to execute application programs delivered from a membership services intermediary. The membership services intermediary may organize information for a user of the computer program product and a mortgage broker. The computer program product may be configured to receive updated real estate information over the communication network from a mortgage broker. The updated real estate information may be received in near-real time.

The computer program product may have instructions to cause a programmable processor to locate information for a real estate service provider from any of a zip code, a telephone country code, a telephone number area code, a city name, or a state name entered into the mobile device. The computer program product may also have instructions to cause a programmable processor to rank mortgage brokers based one or more factors. The one or more factors can include a cost of a loan from the mortgage broker, a fee of the mortgage broker, and a geographic location of the mortgage broker. The pre-populated data for the one or more templates and forms may include names, addresses, and telephone numbers.

The communication network may include any of a satellite channel, a telephony channel, an optical channel, a wireless channel, a cable channel, or the Internet. The computer program product may also have a real estate tool suite that includes information for real estate locations, real estate values for one or more areas, charts to show bidding ranges, directions to property locations, area neighborhood information, a listing of mortgage brokers, and a listing of home maintenance, repair service providers, and local home improvement stores. The real estate tool suite may be operable to use information transmitted over the communication network in near-real time.

In another general aspect the disclosure relates to a computer program product, tangibly stored on a computer-readable medium for presenting merchant information to a mobile device, including instructions operable to cause a programmable processor to receive mobile device user information relating to a geographic location to locate one or more merchants within a subscription-based shopping network. The instructions are also operable to cause a programmable processor to receive mobile device user information relating to a merchant type within the subscription-based shopping network, and receive, from a database over a communication network, information for one or more merchants associated with the mobile device user information for the geographic location and the merchant type. The instructions are also operable to cause a programmable processor to present the associated merchant information on the mobile device.

Advantageous implementations can include one or more of the following features. The computer program product can include instructions operable to send any the of mobile device user information for the geographic location and the merchant type to the database over the communication network. The device user information relating to the geographic location can include any of an area code, a ZIP code, a city name, or a township name. Each merchant within the subscription-based shopping network can be associated with at least one merchant type in the database. The merchant type can be classified by at least a product or service provided by the merchant. The associated merchant information can include any of a merchant name, a merchant address, a merchant telephone number, a merchant advertisement, a merchant coupon, a merchant product offering to subscribers of the shopping network, or a merchant service offering to subscribers of the subscription-based shopping network.

The computer program product can include instructions operable to execute application programs delivered from a membership services intermediary. The membership services intermediary can organize information for the one or more merchants and subscribers within the subscription-based shopping network. The computer program product can have instructions operable to synchronize subscription-based shopping network data with a web portal, and provide the membership services intermediary with access to the web portal.

In some implementations, the mobile device may have software to interact with a shopping network to provide information relating to deals, sales, bargains, and coupons for merchants and services in a particular area code and city. Subscribers to the shopping network can include mobile device users. The shopping network can include merchants and service providers and can include a shopping network intermediary to register the merchants and service providers into the shopping network.

Some advantages for the mobile device users include an ability to receive information relating to product and services for a particular geographic area. The received information can include deals, sales, bargains, and coupons for merchants and services in a particular area code and city. The received information may also be oriented for a selected type of product or service.

Other advantages include a wireless and/or telecom service provider using the shopping network to increase customer retention, loyalty, and add service contracts for mobile device users. The wireless and/or telecom service provider can increase sales of their products and reduce losing customers due to number portability and customer turnover. Number portability can refer to an ability for mobile phone users to change service carriers while keeping the same phone number. The shopping network can also serve as an incentive for new customers to select to have service with the telecom service provider. The shopping network incentive can be on top of other incentives to join a telecom service provider, such as a type of phone, a number of minutes for a cell phone plan, a coverage area, and promotional accessories, such as batteries, cases, and battery chargers.

Still, other advantages include having merchants and service providers within the shopping network to have customers directed to the merchants' goods and services. The deals, sales, bargains, and coupons offered by merchants in a particular area code and city can be used to increase revenue for the merchants without additional spending on advertising.

In other implementations, the mobile device can include software tools that can be used in the real estate and mortgage industries. For example, the mobile devices can be used to conduct real estate transactions, check customer credit ratings, form contracts, prepare loan applications and approvals, can capture signatures. Real estate agents can use the mobile device software to conduct their business with customers away from their office. Mortgage companies can receive customer information for the loan process and submit a status of the loan application to the mobile device user.

Some information may be accessible to mobile devices on a fee basis via an authentication mechanism utilizing user names and password protection. Alternatively, some information may be freely provided, as long as the mobile device user remains a subscriber. The content sent to the mobile device user may be individually customized based on the subscriber's preferences.

The subscription system can include an external subscription database to store information associated with subscribers. The use of subscriber preferences may involve sending merchant information to the mobile device of the subscriber based on an area code, a telephone country code, a zip code and/or city and state names. The received information may be compared with zip codes, telephone country codes, telephone number area codes, and/or city and state names stored in a networked database, and merchant information or real estate information may be provided to the one or more mobile devices when information received from the one or more mobile devices corresponds with similar or the same information stored in the networked database.

The communication network for the mobile device may include any one of a satellite channel, a telephony channel, an optical channel, a wireless channel, a cable channel, and the Internet. The event data provided may be based on a geographic region relating to any of the zip codes, telephone codes, or city and state information.

Details of one or more implementations are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

The following detailed description makes reference to the accompanying drawings. Other embodiments of the present disclosure are possible and modifications may be made to the embodiments without departing from the spirit and scope of the disclosure. Therefore, the following detailed description is not meant to limit the disclosure.

Moreover, for convenience in the ensuing description, some explanations of terms are provided herein. However, the explanations contained herein are intended to be exemplary only. They are not intended to limit the terms as they are described or referred to throughout the specification. Rather these explanations are meant to include any additional aspects and/or examples of the terms as described and claimed herein and/or as used by one of skill in the art.

The following describes various tasks, techniques, and systems relating to fee-based or free subscription-based services for mobile devices. In some applications, the subscription-based services related to locating services provided from merchants and service providers in a shopping network. In other applications, the mobile device can include tools for services for real estate agents and mortgage companies.

Figure 1:
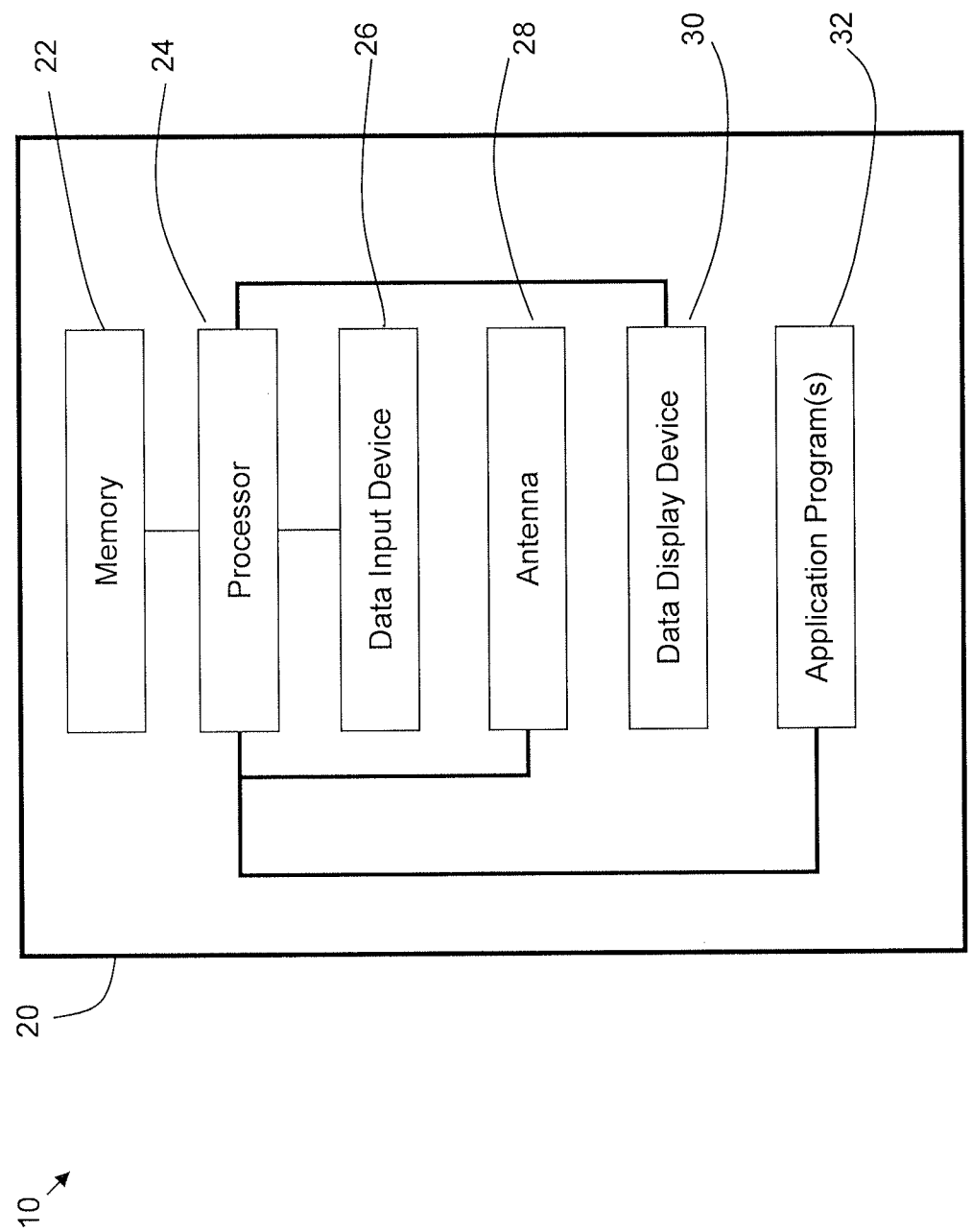
FIG. 1 shows an exemplary block diagram of a mobile device.

FIG. 1 illustrates a mobile device 10 for conducting mobile communications. The mobile device 10 includes a housing 20. The housing 20 may generally be formed of a durable material, such as hardened plastic or metal, to house and protect the components of the mobile device 10. The mobile device 10 further includes a memory 22, one or more processors 24, an antenna 28, a data display device 30, and one or more application programs 32. The memory 22 stores application programs and data. Examples of the memory 22 include, but are not limited to, electrically programmable read-only memory (EPROM) and/or electrically erasable and programmable read-only memory (EEPROM). Other structures for the memory 22 may be employed.

The memory 22 is operably connected to the processor 24 so that the processor 24 may execute one or more application programs stored in the memory 22. The memory 22 may be electrically connected or optically connected to the processor 24 so that digital signals may be communicated between processor 24 and memory 22. Processor 24 is operably connected to data input device 26, which may permit a user of mobile device 10 to input data into memory 22 that can be acted upon by processor 24.

The mobile device 10 further includes one or more data input devices 26 by which a user enters data and instructions into the mobile device 10. Examples of data input devices include, but are not limited to, keypads, keyboards, microphones, and/or touch screens. An antenna 28 is operably connected to the processor 24 so that signals generated by processor 24 may be transmitted from the mobile device 10 to one or more other communication devices that can receive the signals. The antenna 28 may receive signals from one or more communication devices and may relay or communicate those signals to the processor 24 so that the signals may be processed or stored in memory 22. The antenna 28 is a component of both data transmitting means and data receiving means for the communication device. A display device 30 can be operably connected to the processor 24 to display data input by the user of mobile device 10 and/or data received by antenna 28. Those having skill in the art will realize that the mobile device 10 is not limited only to the components shown or described, and that additional components may be provided.

The mobile device 10 also includes one or more application programs 32, which can be stored in memory 22 and executed by processor 24. Each application program 32 includes a set of instructions that are executed by processor 24. Each application program 32 is executed to process transaction data or to locate merchants based on user input or user requests.

After the data has been entered into the mobile device 10, the data may be transmitted over a computer network to a data storage device. For example, a suitable data storage device may be a database on a computer. The computer network may be any type of computer network, including local area networks (LANs), wide area networks (WANs), and the Internet. The computer network may be a hard-wired network, a wireless network, or a combination thereof. In some implementations, the computer network includes a wireless network between the mobile device and a computer at a wireless signal receiving station.

Figure 2A:
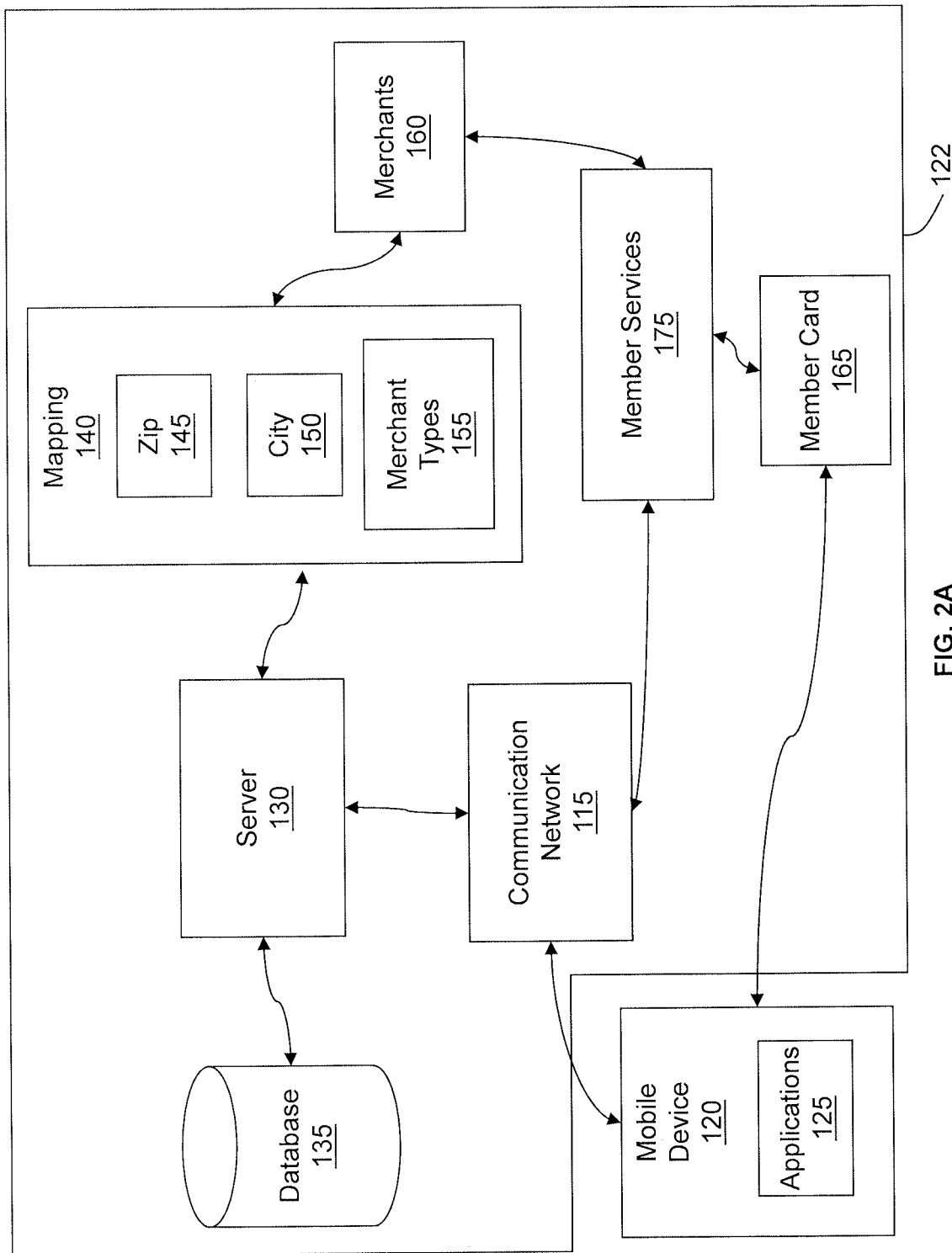
FIGS. 2A-2B show exemplary block diagrams of mobile device interactions with the subscription service.
Figure 2B:
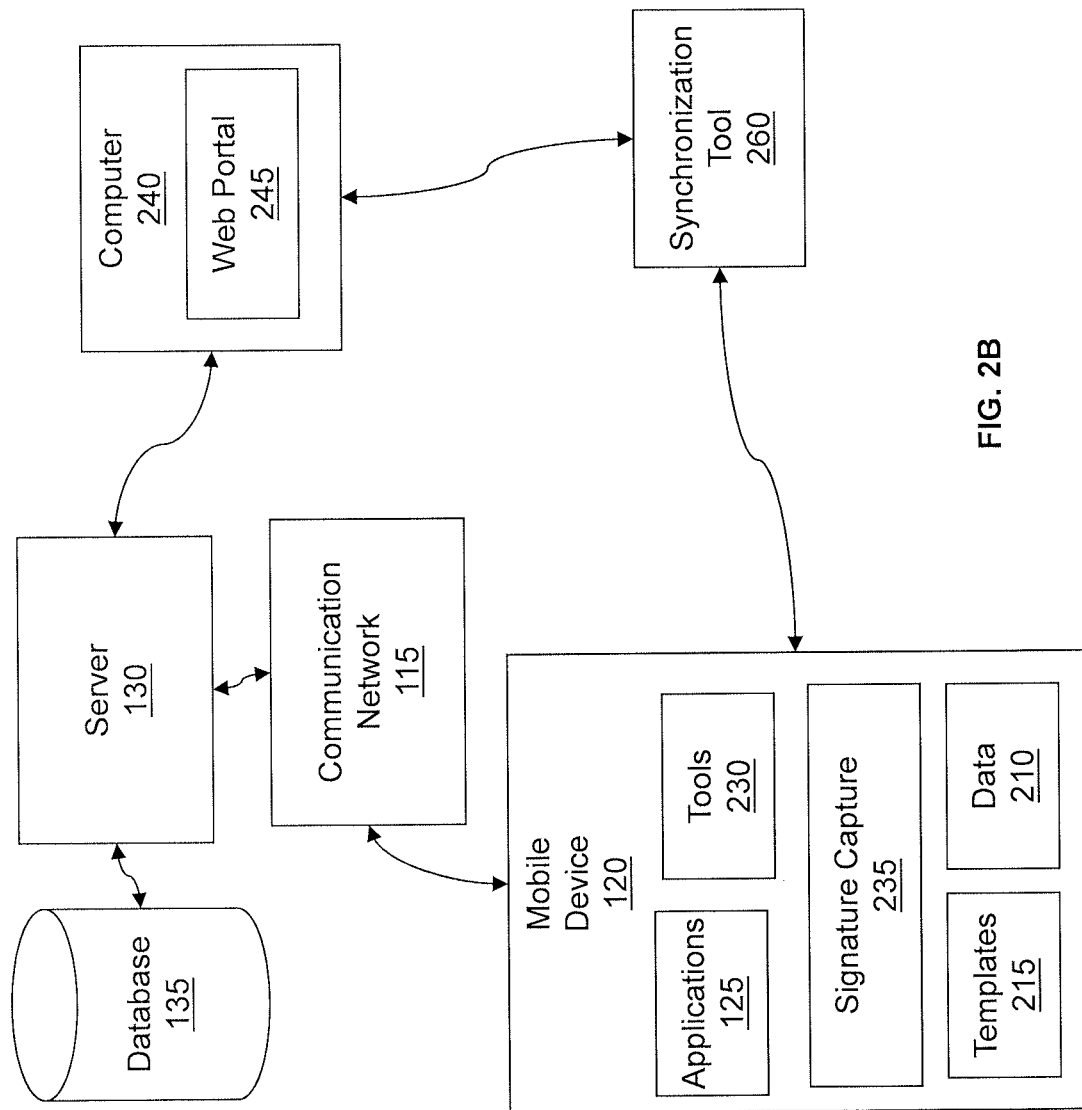

FIGS. 2A-2B show block diagrams of interactions within a subscription service for providing commercial resources. FIG. 2A shows a framework for software applications 125 on a mobile device 120 interacting with an exemplary subscription service 122 for commercial resources. Within the framework, the mobile device 120 is connected with a communication network 115. The communication network 115 interacts with a server 130 that is connected to a database 135. The database 135 stores information for merchants, service providers, and members associated with the subscription service for commercial resources. Merchant information may include, for example, a category or type of service or product provided by the merchant, the address information of the merchants, and related advertising and pricing information.

In some implementations, the subscription service 122 may be a shopping network with multiple merchants 160 that provide commercial resources including merchant information, special deals, bargains, discounts, coupons, rebates, and advertisements to subscribers of the shopping network. Subscribers of the shopping network may have a member card 165 to show membership to the shopping network and can receive information for the special deals, bargains, discounts, and advertisements from the merchants using the applications 125 on the mobile device 120. A member service intermediary 175 can provide member cards 165 to subscribers of the shopping network and can interact with merchants 160 associated with the shopping network. The member service intermediary 175 can also provide software to subscribers for the mobile device 120 either via the communication network 115 (e.g., a software download) or via a physical storage medium (e.g., an application to install from a compact disc). The member service intermediary 175 can arrange, modify, and organize data in the database 135.

A subscriber to the shopping network can use a mobile device 120 to enter information about their present geographic area and a preferred type of service or good, and the member service intermediary 175 uses a mapping tool 140 to match merchant information, such as merchant types 155 and merchant address information (e.g., zip 145 and city 150) with user preferences.

Alternatively, the mobile device 120 may be configured to automatically locate a geographical area in which the mobile device 120 is located. For example, the mobile device 120 may have global positioning system (GPS) capabilities or may have capabilities to locate a local area code. For example, the mobile device 120 can send a signal to a telecommunications service carrier and the telecommunications service carrier can identify a general location of the signal received based on satellite positioning or based on an interaction with a base station within the local area of the mobile device.

Information that is matched from the mapping tool 140 can be sent from the server 130 through the communication network 115 and back to the mobile device 120. The applications 125 on the mobile device 120 can show one or more merchants that are matched within the shopping network relating to the submitted user preferences. A user of the mobile device 120 can visit the one or more matched merchants to receive the merchant's advertised goods and services. The user of the mobile device 120 can also show the member card 165 to merchants to show member identification and verify that he or she is subscribed to the shopping network. In some implementations, the membership card 165 may also serve as a debit card or credit card. In addition to or instead of a member card 165, the mobile device itself may have membership information on hardware or software to identify a member.

FIG. 2B shows a framework for software components 125, 210, 215, 230, 235 on a mobile device 120 interacting with an exemplary subscription service for commercial resources. The exemplary block diagram of the mobile device 120 shown include applications 125 related to the subscription service, such as software for graphical user interfaces (GUIs) for subscription service entries and results for commercial resources. The mobile device 120 includes tools for a subscription network, such as a calculator, a tool to estimate distance to merchants, and tools to organize merchant information. The tools 230 may also include encryption and decryption capabilities, and software for passwords and mobile user identification names. The exemplary mobile device 120 shown has signature capture capabilities 235, which can be useful in completing transactions, making purchases, forming contracts, and submitting financial and loan information. The exemplary mobile device 120 includes templates 215 for forms and documents, and the mobile device 120 also includes data 210 associated with the subscriber, merchants, member services intermediary, and transactions.

As in FIG. 2A, the mobile device in FIG. 2B can be coupled to a database 135 through a server 130 connected to a communication network 115. The server 130 may also couple to a computer 240. The computer 240 may be, for example, a desktop computer, notebook computer, or a workstation at a home or office. The computer can use a web portal 240 to receive data from the mobile device 120 sent over the communication network 115. Instead of or in addition to interacting with the computer 240 over the communication network, the mobile device 120 can upload and download data with the computer 240 via a synchronization tool 260. The mobile device 120 may physically connect to the synchronization tool or may connect to the synchronization tool 260 wirelessly. In some implementations, the synchronization tool 260 may be part of a data hub. The synchronization tool 260 may be able to transmit data and information between the mobile device and the computer 240 at data rates that are higher than over the communication network 115. When synchronizing the mobile device, "offline" entries, edits, and changes to the data 210, tools 230, applications 125, signatures, and/or templates 215 can be updated to or from the mobile device 210. Entities associated with the subscription system, including subscribers, merchants, and the member services intermediary, may be able to update and modify shopping network information using a given web portal or mobile device.

Figure 3A:
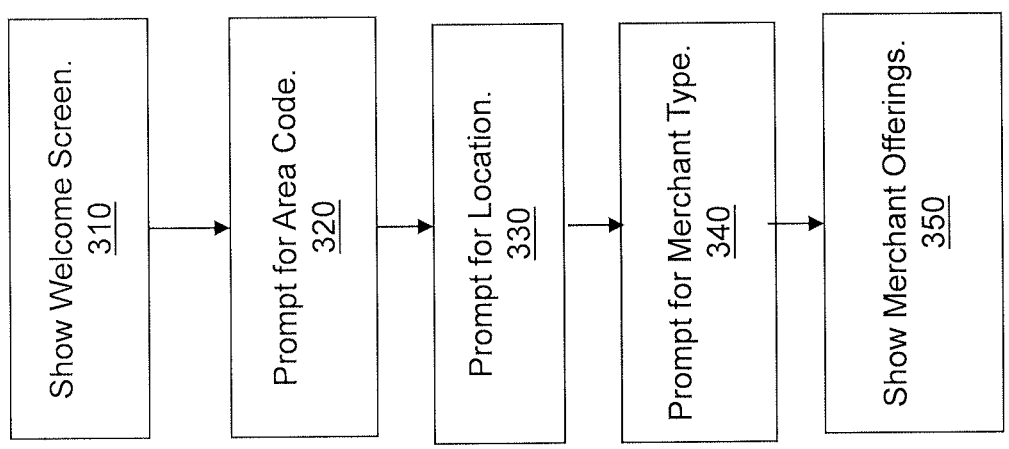
FIGS. 3A-3B show exemplary flowcharts for the using the software tools on the mobile device.
Figure 3B:
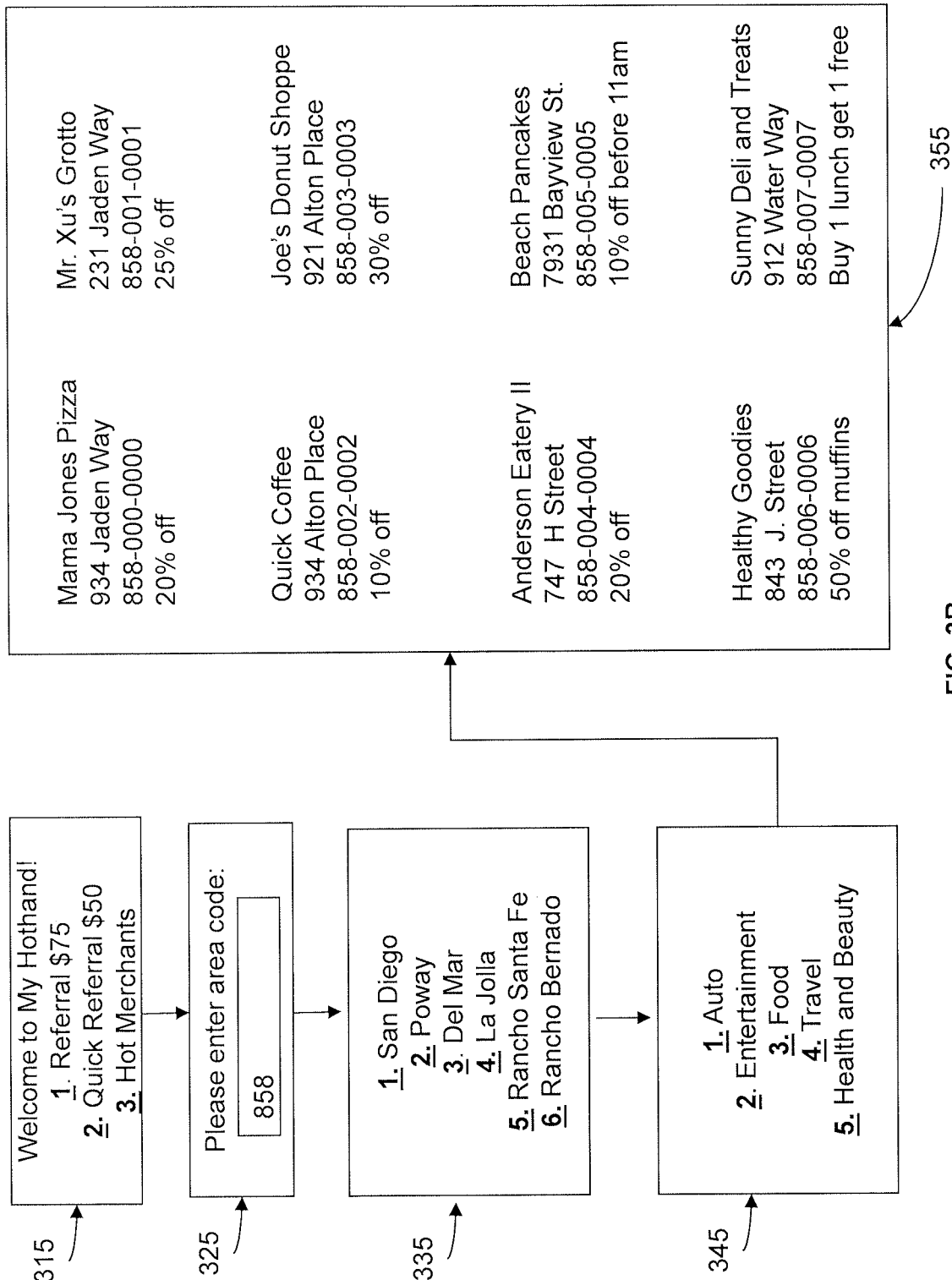

FIGS. 3A-3B show flowcharts for the using the software tools on the mobile device. FIG. 3A shows a series of questions that are prompted to a user of the mobile device for the shopping network. When opening a software application related to the shopping network, the a "welcome screen" is displayed on the device (block 310). The software application may prompt the mobile device user to enter an area code to locate merchants and service providers (block 320). The software application may prompt the mobile device user to enter a particular location within that area code, such as a city or township within the entered area code (block 330). The software application may then prompt the mobile device user to enter a particular merchant type, such as a merchant type for food, entertainment, or travel (block 340). The software application may show available merchant offerings for the selected merchant type within the selected geographical area (block 350).

FIG. 3B shows an example of the software application flowchart shown in FIG. 3A. In FIG. 3B, a "welcome screen" is shown on the mobile device (block 315). The welcome screen may have selections for the mobile user to begin to navigate the options provided in the shopping network. For example, if the user selects to refer another potential mobile device user to subscribe to the shopping network, the user may receive additional promotional offers from merchants. If the user selects to locate merchants in a geographic area, then the software application prompts the mobile device user to enter an area code to locate merchants and service providers (block 325). The software application may prompt the mobile device user to enter a particular location within that area code, such as a city or township within the entered area code (block 335). The software application may then prompt the mobile device user to enter a particular merchant type, such as a merchant type for automobiles, food, entertainment, travel, or health and beauty (block 345). The software application on the mobile device may show available merchant offerings for the selected merchant type within the selected geographical area (block 355). For example, if a "Food" merchant type is selected (block 345), then offerings from merchants for restaurants can be shown (block 355). The offerings from the merchants may include address and telephone information for the merchants, as well as special discounts for shopping network subscribers. In some implementations, subscribers to the shopping network may show a membership card to merchants to verify membership in the shopping network.

The merchants within the shopping network can change or update product or service offerings in near-real time (e.g., substantially in real-time with a small time delay for data transmission). The near-real time updates of offerings can provide advantages over paper coupons or printed advertising. For example, a mobile device user may be able to see the latest offerings in a local area without the hassle of trying to determine whether a merchant offering has expired. In one implementation, the latest product offerings can be downloaded onto the mobile device whenever a mobile device user attempts to search for offerings on the mobile device. The merchants may be able to update and change offerings on a web portal.

Figure 4:
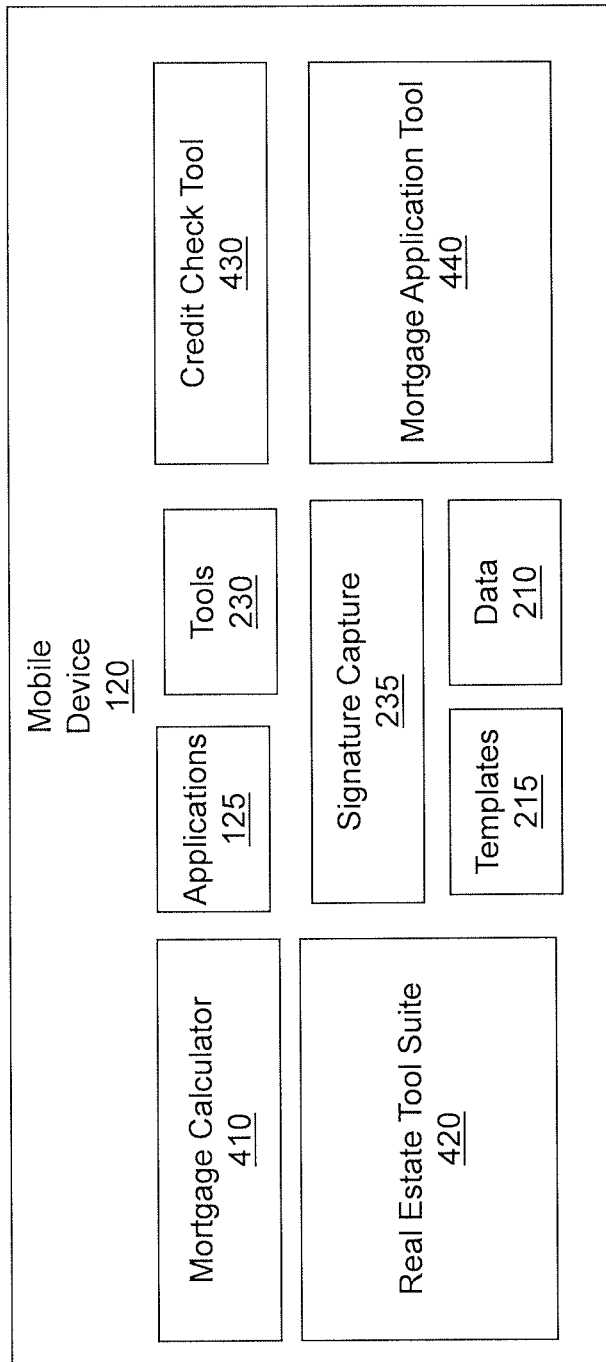
FIG. 4 shows exemplary mobile device software components.

FIG. 4 shows mobile device software components. In addition to the software components 125, 210, 215, 230, 235 on the mobile device 120 described with respect to FIG. 2B, the mobile device 120 may have tools and applications for the real estate and mortgage industries. For example, the mobile device 120 may have software for a mortgage calculator 410. In some exemplary implementations, the mortgage calculator 410 may have a functionality to calculate monthly loan payments, interest and principal payments, loan fees, points, deductions, transaction costs, amortization schedules, and annual percentage rates. The mobile device 120 may have a credit check tool 430 to handle data related to checking the credit of real estate applicants. The credit check tool 430 may interact with data from the web portal 245 shown in FIG. 2B.

In some implementations, a mortgage application tool 440 may use the templates 215 and data 210 in the mobile device 120 for preparation of mortgage applications 440. For example, the templates 215 and data 210 in the mobile device 120 may be pre-populated with data, such as address and telephone information. Alternatively, a user of the mobile device can pre-populate data fields within a mortgage application template while the user is away from a computer or home office. The mortgage application tool 440 can be used to make real estate agents more efficient, and can allow the agents to conduct transactions at various locations. The mobile device may also have a real estate tool suite 420. The real estate tool suite 420 may include, for example, information for real estate locations, real estate values for particular areas, charts to show bidding ranges, directions to properties, area neighborhood information, a listing of mortgage brokers, and a listing of home maintenance and repair service providers.

Figure 5:
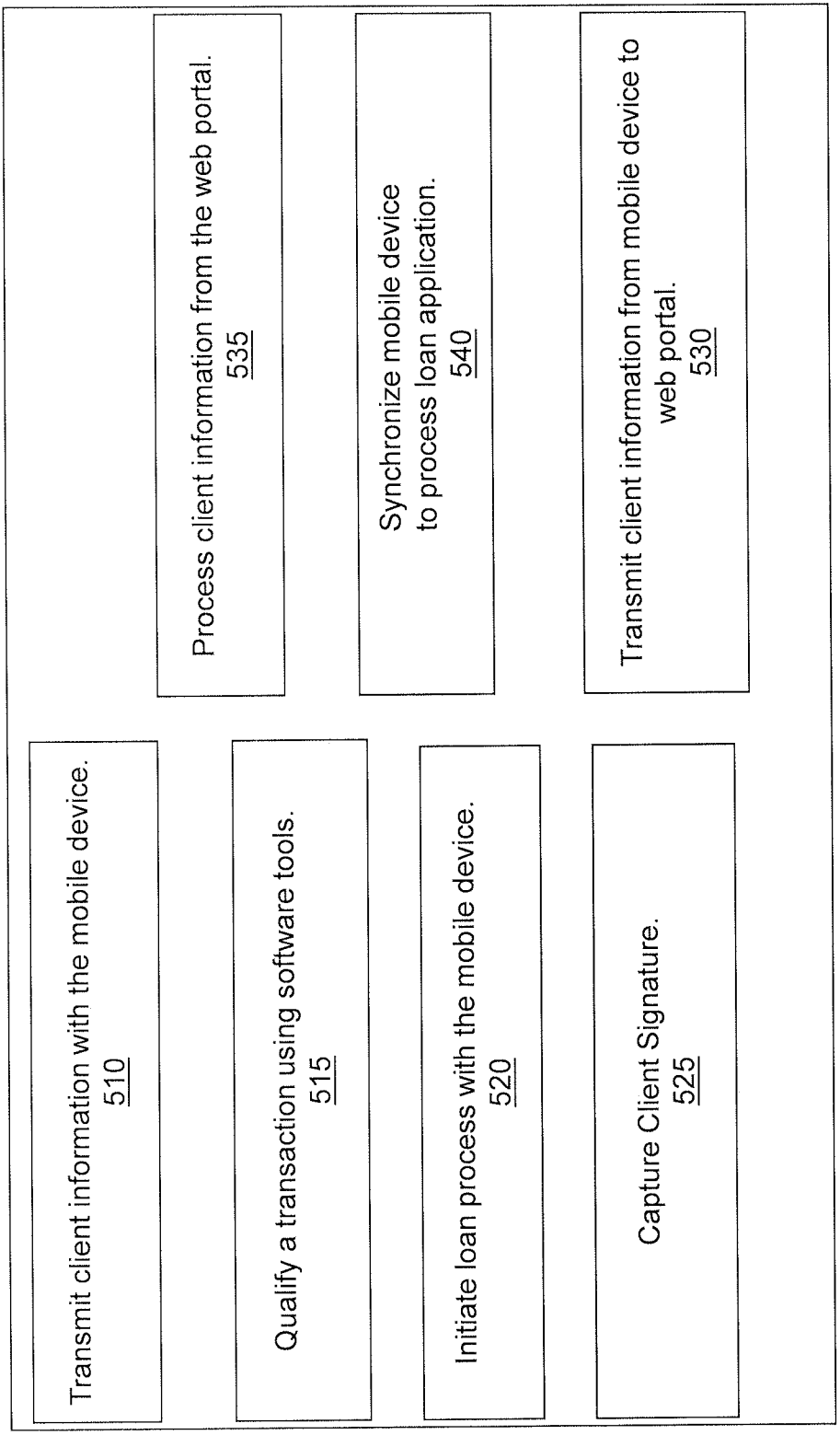
FIG. 5 shows exemplary functions of the mobile device's software components.

FIG. 5 shows exemplary functions 560 of the mobile device's software components in a real estate example. The mobile device can be used to transmit client information (block 510). The mobile device can interact with the communication network, as described in FIG. 2B, and one or more web portals (block 530). The mobile device can qualify a transaction (block 515) using one or more of the tools and applications described in FIG. 4. The mobile device may be used to initiate a loan (block 520) and capture a client's signature (block 525). The mobile device may able be used to process client information received from the web portal (block 535). As shown in FIG. 2B, the mobile device can synchronize with a computer. Data from the mobile device can be synchronized to process the loan application (block 540).

A mortgage loan company may have an origination system to receive information loaded into one or more real estate web portals. The mortgage loan origination system can poll the one or more real estate portals and import or export client information for the loan origination process.

In some implementations, a subscriber system can use a password to authenticate a subscriber for the service. User names and user preferences may be stored in one or more databases. Each user may have a user name and password, and the mobile device users may have the ability to select from an array of merchants and/or services. In some implementations, the mobile device users can enter zip codes, telephone country codes, telephone number area codes, city and state names by comparing zip code/phone or country codes preferences to the content providers zip code/phone and complete telephone numbers to enables subscribers to choose from among a range of merchants and/or services that may be available. Each mobile device user may set up individualized user preferences on the desired content, if a customer, or real estate service, if an agent. The subscription service provider may have content that is specific for various zip codes, country codes or area codes.

The subscription system can allow the real estate agent to close a deal with a client at any location, whether in a real estate office or remotely (i.e., out in the field). The subscription system is not limited to forming contracts and accepting offers in the real estate industry, but may be used in other industries, such as the insurance industry, the automobile industry, and the travel industry.

In some implementations, the mobile device may have advertising from local and national mortgage loan companies. The mortgage loan company can subscribe to the subscriber system to generate business and provide real estate agents with near-real time lending information and rates. The mobile device may also have software to rank the mortgage loan company based on one or more factors, such as the cost of the lender, the fees of the lenders, and/or whether the lender is national or regional.

The mortgage loan companies within the shopping network can change or update service offerings or rate information in near-real time (e.g., substantially in real-time with a small time delay for data transmission). The near-real time updates of offerings can provide advantages over printed advertising or going back to the office to check the Internet for the latest rates and fees. In one implementation, the latest offerings can be downloaded onto the mobile device whenever a mobile device user attempts to search for offerings, rate information, real estate, or contract information on the mobile device. The mortgage loan companies may be able to update and change offerings on a web portal. In some implementations, subscribing to the subscriber system can also allow the mobile device user to have access to the discounts and promotions for the shopping network described in FIGS. 1-3B.

Examples of communication networks include various forms or mediums of data communications, such as a local area network ("LAN"), a wide area network ("WAN"), a wireless local area network ("WLAN"), and a personal area network ("PAN"). Other examples of communication networks include a mobile communication network using a multiple access technology, such as a cellular phone network with Code Division Multiple Access, ("CDMA"), a satellite network, and the Internet.

The data that can be sent over the communication network can be displayed on one or more mobile devices such as computers, cell phones, and personal digital assistants (PDAs). The communication network can interact with a server to communicate with multiple devices. The server may refer to one or more hardware servers, or software servers, such as a server program. The devices may be internet-compatible devices and may be connected through a cellular phone network. As used herein, a mobile device may also refer to any general-purpose mobile machine that processes data according to a set of instructions that is stored internally either temporarily or permanently, including, but not limited to, general-purpose mobile computers, laptop computers, internet-compatible mobile phones, wired or wireless laptop computers. The mobile devices may also include satellite-based transmission devices, smart client devices (that actively fetch data and store data locally), wireless devices, a cellular or mobile telephone, an electronic handheld unit for the wireless receipt and/or transmission of data, a media content playable device, such as an MP3 player, or the like.

Although the some of the implementations of the disclosure herein are described with particular reference to wireless telephones, the disclosure is not to be construed as being limited only to wireless telephones. For instance, mobile devices can include portable handheld communication devices including, at least, portable computers, such as personal digital assistants, and text messaging systems, such as two-way pagers, and mobile email communication tools, such as Research in Motion, Ltd.'s (RIM) Blackberry. In other words, the present disclosure can encompass handheld communication devices that are capable of communicating over multiple different communication networks, including wireless computer networks. The handheld communication devices can be able to communicate with one or more handheld communication devices, and/or one or more computers operably connected to the computer network. Handheld communication devices can be able to transmit data input by a user of the device to a data storage device, such as a computer, and more particularly, a database of the computer. In addition, the handheld communication device can be able to receive data over a computer network, for example, by the computer to which it transmitted the data. Each device may have a specific or unique internet address, in which the communication network may direct data to one or more devices based on the device's internet address.

To provide for interaction with a user, the mobile devices can use a display, such as a cathode ray tube (CRT) or liquid crystal display (LCD) monitor, which displays information to the user and a keyboard and/or a pointing device, such as a mouse or a trackball, to serve as input to the mobile device. The mobile device may provide feedback to the user with any form of sensory feedback, such as visual feedback or tactile feedback.

The communication network may include a back end component, such as a data server, or a middleware component, such as an application server, or a front end component, such as a client computer having a graphical user interface, portal, or a Web browser through which a user can interact with an implementation of the systems and techniques described here. The mobile device itself may have a front end component that includes a graphical user interface. In general, the communication network and/or the mobile device may use any combination of such back end, middleware, or front end components.

The software (also known as programs, software tools or code) may include machine instructions for a programmable processor, and can be implemented in a high-level procedural and/or object-oriented programming language, and/or in assembly/machine language. The mobile device may have an Application Programming Interface (API). For example, the mobile device may also run on a Binary Runtime Environment for Wireless (BREW) platform, an open-source on-line application development platform for wireless CDMA devices from Qualcomm, Inc. of San Diego, Calif. The BREW platform can allow application developers to write programs and scripts in various software languages, such as C, C++, JAVA, and XML. The mobile device may have a software media player, such as a Windows media player, that can show text data and/or a video presentation.

As used herein, the term "machine-readable medium" refers to any computer program product, apparatus and/or device used to provide machine instructions and/or data to a programmable processor, including a machine-readable medium that receives machine instructions as a machine-readable signal. The machine-readable medium refers to magnetic discs, optical disks, memory, Programmable Logic Devices (PLDs), and the like. The term "machine-readable signal" refers to any signal used to provide machine instructions and/or data to a programmable processor.

In some implementations, the subscriber may have preferences for data from merchants and/or service providers based on selected zip codes, area codes, or country codes of the merchants and/or service providers. The subscriber data may be authenticated by a subscriber data interface. In some implementations, the mobile device subscribers may be mobile phone subscribers. In other implementations, the mobile device subscribers may be using WiMax, the IEEE 802.16 Air Interface Standard. The mobile device subscribers can enter a user name and a password for authentication via a subscriber database interface.

In some implementations, the subscribers may have a free subscription to the shopping network or real estate services. In other implementations, the subscribers may have a fee-based subscription to the shopping network or real estate services. Alternatively, the subscribers may have a free subscription to some free real estate service providers and a fee-based subscription to fee-based other real estate service providers.

The merchant types are not limited to the merchant types shown in FIG. 3B, but may include other merchant types. For example, other merchant types may include merchants that provide goods and services in areas for pets, clothing and accessories, toys, books, hardware and tools, computers, electronics, jewelry, music, watches, sports, gifts, outdoor gear, arts, crafts, antiques, rentals, and home and garden supplies and services. In some implementations, the mobile device user may navigate through additional prompts to search among the additional merchant types. In some implementations, the shopping network may form a partnership with a wireless communication carrier and merchants subscribed to the shopping network may have privileges to present promotional offerings to the wireless communication carrier subscribers.

Other implementations may be within the scope of the following claims.

The invention claimed is:

1. A method of obtaining a location specific service from a service provider on a communication network, comprising:
   running a computer application on a mobile device, the application communicating to receive information from a network which has multiple service providers, and the application receiving inputs to interact with the network,
   the network storing information about multiple service providers, said information including locations for the respective multiple service providers, wherein the computer application includes information for the offerings of the service providers, including a type of service provided by each service provider, and pricing information for the type of service provided by the service provider,
   where information about multiple service providers changes over time, and is updated over time on the network in near real time;
   the computer application storing information to identify a user of the mobile device and storing payment information for the user to be used on the network to pay to the service providers;
   the computer application determining a location of the user using the mobile device and to obtain information about the locations of multiple different service providers on the network who are offering services, based on the location of the user, and based on an area of the service providers relative to an area of the user;
   the computer application showing service providers and showing the area of the user of the mobile device;
   the computer application using one or more forms, where the forms include pre-populated data, and are sent over the communication network, to the mobile device, in near real time;
   and
   allowing the user to effect a purchase from one of the service providers using the application and using the payment information that is stored using the application.

2. The method as in claim 1, further comprising updating a display of the mobile device in near real time by determining whether any of the offerings of any of the service providers has changed, and updating offerings for any of the offerings for any of the service providers that have changed.

3. The method as in claim 2, wherein the pre-populated data for the one or more forms includes name and addresses.

4. The method as in claim 2, wherein the pre-populated data for the one or more forms includes telephone numbers.

5. The method as in claim 1, wherein the computer application uses a tool to estimate distance from the mobile device to the service providers.

6. The method as in claim 1, further comprising receiving user preferences from the user using the mobile device; and where the showing available service providers providing services for the geographic area of the user of the mobile device includes only those service providers who meet the user preferences.

7. The method as in claim 1, wherein the computer application includes information for the offerings of the service providers, including a type of service provided by each service provider, and pricing information for each service provider.

8. The method as in claim 1, wherein the computer application uses a tool to encrypt and decrypt data sent from the computer application.

9. The method as in claim 1, wherein the computer application uses a tool to accept a user's password.

10. The method as in claim 1, wherein the computer application uses a tool to synchronize data regarding the service providers between the mobile device and the server.

11. The method as in claim 1, wherein a display of the mobile device shows available service providers offering services of the selected type that are available.

12. The method as in claim 1, wherein the display of the mobile device shows telephone information for the service provider.

13. The method as in claim 1, wherein the providers of services provide travel services.

14. The method as in claim 1, where the providers of services are food merchants.

15. The method as in claim 1, where the providers of services are entertainment providers.

16. The method as in claim 1, wherein the using the application comprises initially providing a welcome screen on the mobile device, prior to displaying information about the service providers.

17. The method as in claim 1, wherein the using the application comprises, after providing the welcome screen, prompting the user to select a type of services desired, and subsequent to selecting the type of services provided, showing available offerings for the area of the mobile device.

18. The method as in claim 1, wherein the area of the mobile device is a geographic area.

19. The method as in claim 1, where the determining whether any of the offerings of any of the service providers has changed, comprises determining whether any of the offerings for any of the service providers have expired.

20. The method as in claim 1, wherein the forms include prepopulated templates.

* * * * *